United States Patent
Raack et al.

(10) Patent No.: US 11,132,343 B1
(45) Date of Patent: Sep. 28, 2021

(54) AUTOMATIC ENTITY RESOLUTION DATA CLEANING

(71) Applicant: Groupon, Inc., Chicago, IL (US)

(72) Inventors: Taylor Raack, Chicago, IL (US); David Alan Johnston, Portola Valley, CA (US)

(73) Assignee: Groupon, Inc., Chicago, IL (US)

( * ) Notice: Subject to any disclaimer, the term of this patent is extended or adjusted under 35 U.S.C. 154(b) by 330 days.

(21) Appl. No.: 15/074,152

(22) Filed: Mar. 18, 2016

Related U.S. Application Data

(60) Provisional application No. 62/135,005, filed on Mar. 18, 2015.

(51) Int. Cl.
| | | |
|---|---|---|
| G06F 16/215 | (2019.01) | |
| G06F 16/23 | (2019.01) | |
| G06N 20/00 | (2019.01) | |
| G06F 16/28 | (2019.01) | |
| G06F 16/901 | (2019.01) | |

(52) U.S. Cl.
CPC ........ *G06F 16/215* (2019.01); *G06F 16/2365* (2019.01); *G06F 16/285* (2019.01); *G06F 16/9024* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,370,328 | B2 * | 2/2013 | Woytowitz | G06F 17/30731 707/719 |
| 9,245,015 | B2 * | 1/2016 | Misra | G06F 17/30731 |
| 9,697,475 | B1 * | 7/2017 | Subramanya | G06N 7/005 |
| 2013/0185314 | A1 * | 7/2013 | Rubinstein | G06F 16/2468 707/749 |
| 2015/0186807 | A1 * | 7/2015 | Scriffignano | G06Q 10/063 705/7.11 |
| 2015/0254329 | A1 * | 9/2015 | Agarwal | G06F 40/295 707/616 |
| 2015/0363476 | A1 * | 12/2015 | Li | G06F 17/30569 707/714 |
| 2016/0180245 | A1 * | 6/2016 | Tereshkov | G06F 16/254 706/12 |

OTHER PUBLICATIONS

U.S. Provisional Application filed Jun. 30, 2014, In re: Johnston entitled Systems, Apparatus, and Methods of Programmatically Determining Unique Contacts Based on Crowdsourced Error Correction, U.S. Appl. No. 62/019,211.

\* cited by examiner

*Primary Examiner* — Giuseppi Giuliani
(74) *Attorney, Agent, or Firm* — Alston & Bird LLP

(57) ABSTRACT

In general, embodiments of the present invention provide systems, methods and computer readable media for automatic cleaning of entity resolution (ER) data persistently stored in a data repository.

24 Claims, 3 Drawing Sheets

AUTOMATIC ENTITY RESOLUTION DATA CLEANING

CROSS REFERENCE TO RELATED APPLICATION

This application is a non-provisional of and claims the benefit of U.S. Provisional Application No. 62/135,005, filed Mar. 18, 2015, the entire contents of which are hereby incorporated by reference.

FIELD

Embodiments of the invention relate, generally, to automatic cleaning of entity resolution (ER) data persistently stored in a data repository.

BACKGROUND

A merchant data repository maintained by a promotion and marketing service is an example of a very large data repository of data collected continuously for a variety of external data sources. Entity resolution (ER) is used to match disparate information about the same merchant entity together. If ER were perfect, no mistakes would be made and all references to each entity would be classified without error. However, mistakes can be made, and data collected continuously can cause the state of the persistent data corpus to evolve. An accurate data repository is important for business; thus, ER data cleaning of the persistent data in the repository is employed to discover and correct ER errors in the persistent data corpus.

Current methods for ER data cleaning exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for automatic cleaning of entity resolution (ER) data persistently stored in a data repository.

In some embodiments, entity resolution is implemented by matching collected disparate data describing the same particular real-world entity. A perfect entity resolution system does not make mistakes, and all references for each real-world object are classified together without error. However, in practice, some ER data errors may occur. These errors may have varying levels of negative effects on a data repository, e.g., performance problems, reporting of incorrect data, and providing inaccurate, confusing, and/or contradictory information to end clients.

Although it is possible to discover and resolve all erroneous ER data in a repository, the cost would be prohibitive for a large corpus. In embodiments, an ER data cleaning system may periodically clean portions of the persistent data by automatically identifying candidate ER error entities (i.e., entities likely to be described by erroneous ER data) within the persistent data and then discovering and resolving any erroneous ER data associated with those identified entities. In this way, ER data cleaning is an ongoing, adaptive process that improves the data quality of the corpus stored in the data repository without incurring the cost burden associated with cleaning the entire corpus at once.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
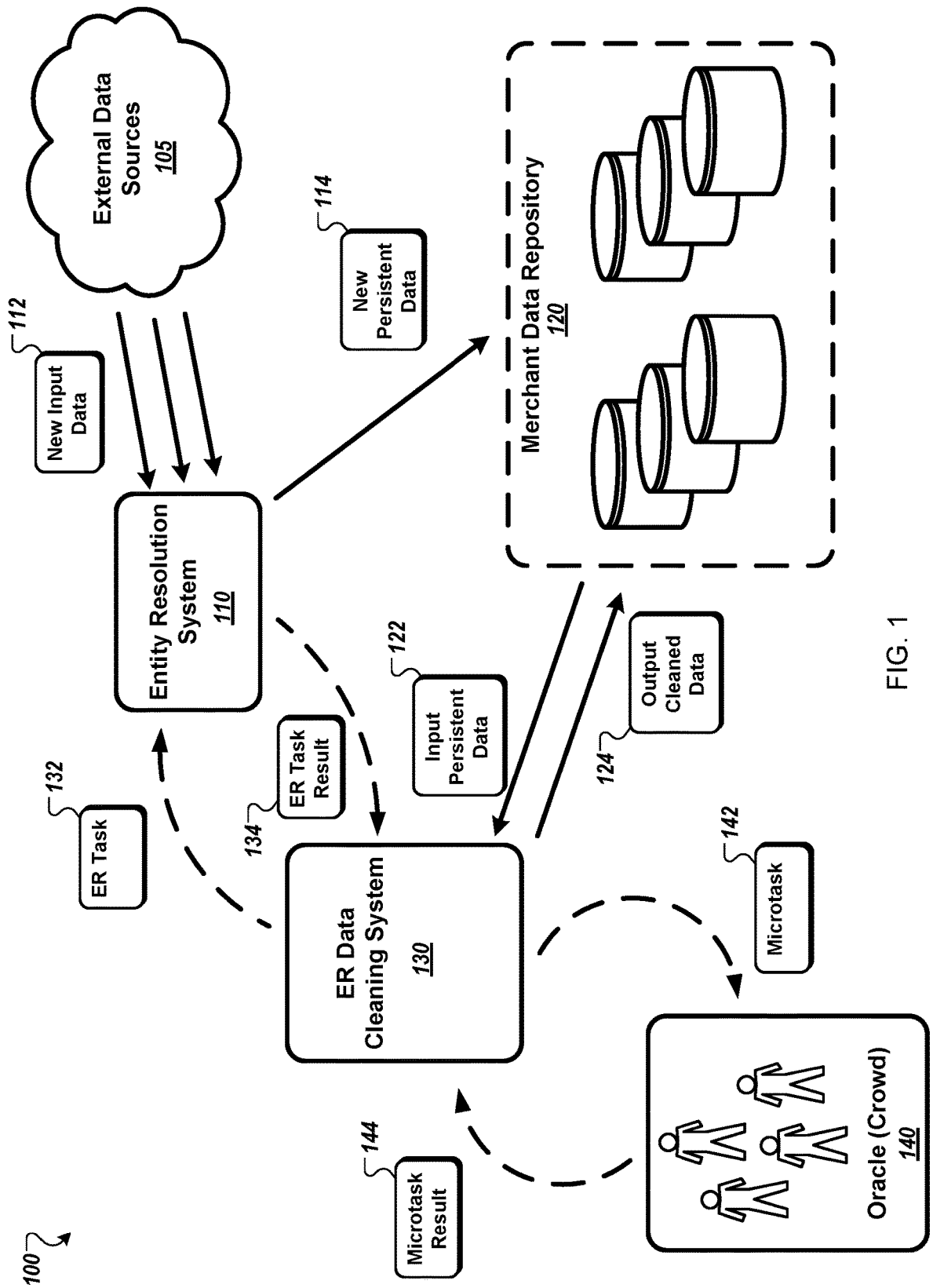
FIG. 1 illustrates an example merchant data management system that can be configured to implement automatic ER data cleaning of persistent data describing attributes of merchant entities in accordance with some embodiments discussed herein.

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "reference" is a description of an entity, which is a real-world object. A reference may be a listing in a database or a list (which may contain some duplicate entries). Multiple references may describe the same entity. Combining data references that each may represent partial information about an entity will enrich the stored representation of the entity.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

It is appreciated while various embodiments discussed herein refer to merchant data or merchants, the techniques discussed herein may also be applicable to non-merchant data or other objects or entities.

A "resolved entity" is a single real-world entity (e.g., a merchant entity) to which N data references are determined to resolve (i.e., describe/pertain to the entity). The way this entity was resolved includes the potential for mistakes, especially egregiously combining references from different entities into the same resolution. Inaccuracies in the ER data of a merchant data repository can have varying negative effects on the business of a promotion and marketing service. These negative effects can range from creating performance problems in various business processing systems, providing incorrect reporting of merchant data and data of downstream consumers, and providing inaccurate, confusing, and/or contradictory information to promotion purchasers. Typically, cleaning of ER data is performed by humans and is extremely costly in terms of both time and resources.

Although it is possible to discover and resolve all erroneous ER data in a repository, the cost would be prohibitive for a large corpus (e.g., a merchant data repository). For example, in some embodiments, a typical merchant entity may be described by tens to hundreds of reference records. Cleaning the ER data describing that one merchant entity may take at least eight hours. Also, for a real time merchant data management system that continuously receives new input data from external data sources, cleaning all of the persistent data at once would not ensure that additional cost would not occur in the future.

As such, and according to some example embodiments, the systems and methods described herein are therefore configured to periodically clean portions of the persistent data by automatically identifying candidate ER error entities (i.e., entities likely to be described by erroneous ER data) within the persistent data and then discovering and resolving any erroneous ER data associated with those identified entities. In this way, ER data cleaning is an ongoing, adaptive process that improves the data quality of the corpus stored in the data repository without incurring the cost burden associated with cleaning the entire corpus at once.

FIG. 1 illustrates an example merchant data management system 100 that can be configured to implement automatic ER data cleaning of persistent data describing attributes of merchant entities according to various embodiments of the invention. Exemplary merchant data management system 100 is described for illustration and not for limitation of the invention.

In embodiments, system 100 comprises an entity resolution system 110 for matching data referencing the same entity; a merchant data repository 120 for storage of persistent data 114 describing merchant location entities; an ER data cleaning system 130 for receiving persistent data 122 that references an ER error candidate entity and then resolving ER errors discovered among the input persistent data 122 by returning output cleaned data 124 to the merchant data repository 120; and an oracle 140 that receives one or more microtasks 142 from the ER data cleaning system 130 for validating relationship data describing the association between at least one pair of references to an ER error candidate entity and returns a microtask result 144 to the ER data cleaning system 130.

In embodiments, the system 100 continuously receives merchant data from a variety of external data sources 105. External data sources 105 may include one or a combination of various online sources (e.g., websites and blogs) and/or data vendors that provide periodic bulk data drops. Merchant data may include, for example, identification data (e.g., name), contact data (e.g., phone number, website, email), and/or address data (e.g., street address, city, state, country, zip code).

In some embodiments, entity resolution is implemented prior to storing received new input data 112 as new persistent data 114 in the merchant data repository 120. In some embodiments, entity resolution system 110 implements entity resolution by matching newly collected disparate data describing the same particular merchant entity. Additionally and/or alternatively, when data that may describe additional merchant attributes and/or new versions of existing attributes are received as new input data 112 by the system 100, entity resolution system 110 combines that data with existing persistent data describing that merchant entity. As the entity resolution system 110 is used on more and more references, the corpus of references coalesces into groups, each of which may more fully represent the state of the real-world objects they model.

In some embodiments, entity resolution system 110 automatically implements entity resolution using a machine learning algorithm, as described, for example, in U.S. Provisional Application 62/019,211, filed Jun. 30, 2014, and entitled "Systems, Apparatus, and Methods of Programmatically Determining Unique Contacts Based on Crowdsourced Error Correction." In some embodiments, a binary classifier, derived using supervised machine learning, is trained to return a result label of "match" or "no match" as a decision of whether or not an input pair of entity references describes the same entity. In some embodiments, the classifier result additionally may include a confidence value that represents the certainty of the classifier decision.

In embodiments, an ER data cleaning system 130 may periodically clean portions of the persistent data by automatically identifying candidate ER error entities (i.e., resolved entities likely to be described by erroneous ER data) within the persistent data and then discovering and resolving any erroneous ER data associated with those identified entities. In embodiments, two types of ER data errors that may be discovered are grouping false positives and grouping false negatives. A false positive (Type I error) occurs when entity references that should be separate are grouped together. For example, in embodiments in which entity resolution is implemented using a binary classifier as previously described, a false positive error may occur due to the classifier "match" decision being made with high confidence at a previous point in time, but the "match" decision that would be made based on current attributes of the input pair of references would be associated with a much lower confidence value. A false negative (Type II error) occurs when references that should be grouped together are not grouped together, causing duplicate groups to occur among the persistent data.

In some embodiments, each of at least a subset of the entities stored in a data repository is assigned an ER error score (e.g., a value between 0 and 1) that represents the likelihood that the entity is described by erroneous ER data. Each entity that is associated with an ER error score that is above an ER error threshold is identified as a candidate ER error entity. In some embodiments, the group of references describing an entity is represented as a graph in which each of the references is a graph node and a pair of nodes is connected by an edge representing the relationship between the pair of nodes. In those embodiments, the ER error score may be derived from the results of an analysis of the graph edges that may include, for example, identifying the longest edges and/or calculating the median of the edge values. In some of those embodiments, deriving the ER error score includes a count of the number of unique reference records, represented by nodes that are not connected to any other nodes in the graph. In some embodiments, deriving the ER error score includes a count of the number of duplicates of an entity that are identified in the persistent data corpus.

In embodiments, the ER data cleaning system 130 receives an input group of references 122 describing a candidate ER error entity and then generates cleaned data 124 by discovering any grouping errors among the references, resolving the discovered errors, and re-grouping the references. In some embodiments, data cleaning may be implemented by generating an ER task 132 be implemented by the entity resolution system 110, where the task is re-calculating a pairwise matching of the input group of references and returning the results 134. In some embodiments, the input group of references may be re-grouped based on the results.

A pairwise match of N references means performing $N^2$ matches. In cases where N is large (e.g., hundreds of references), re-calculating a pairwise matching of the input may not be cost effective. Additionally, this process alone may not identify and resolve all Type II errors in the reference group. Thus, in some embodiments, discovery and resolution of ER data errors may include identifying likely errors among the references, using an oracle 140 (e.g., a crowd, a flat file of data verification results previously received from one or more oracles, and/or data verification software) to verify the identified errors, and implementing smart grouping algorithms when resolving the errors. This process will be described in detail with reference to method 200 in FIG. 2.

Figure 2:
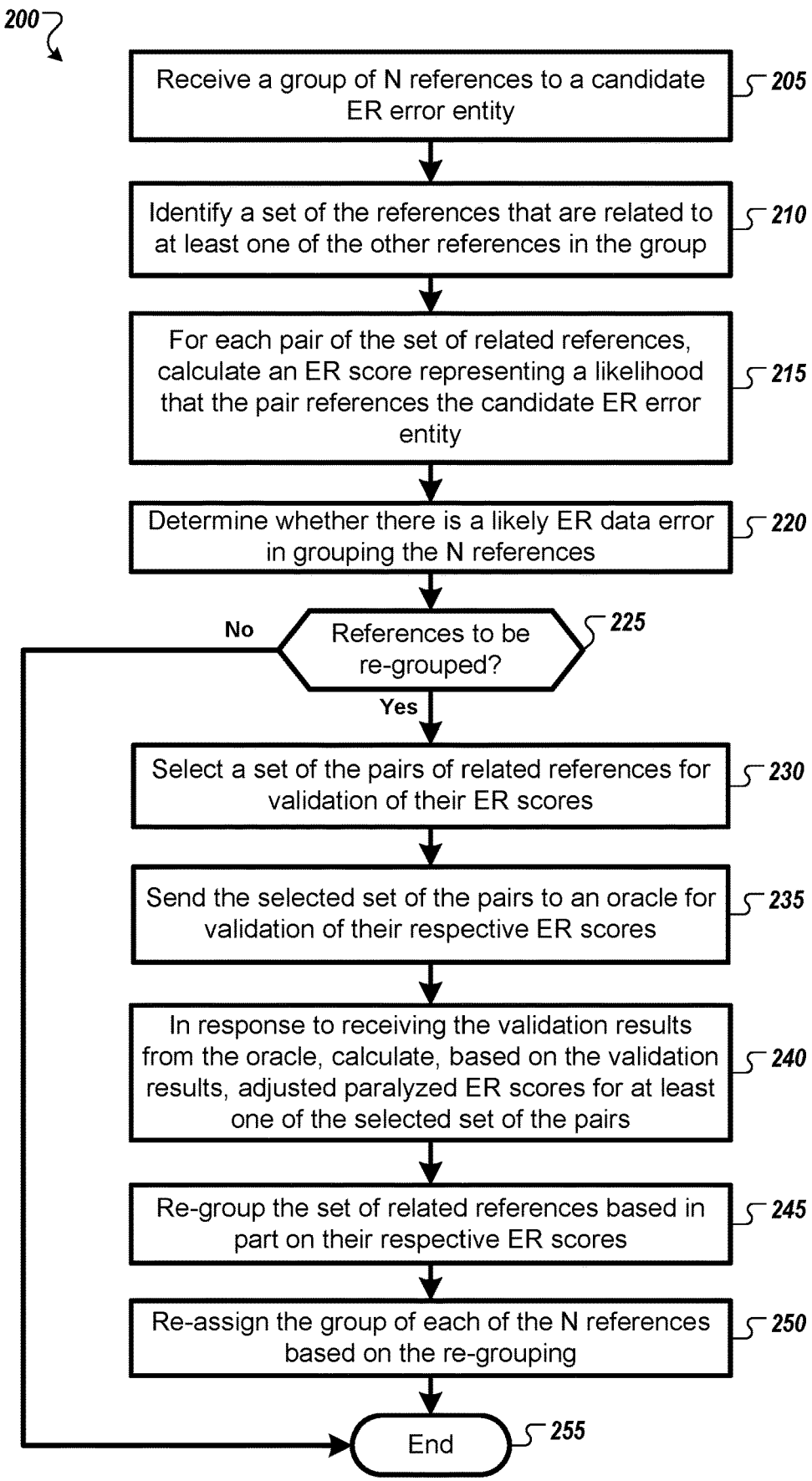
FIG. 2 is a flow diagram of an example method for discovery and resolution of ER data errors in accordance with some embodiments discussed herein.

FIG. 2 is a flow diagram of an example method 200 for discovery and resolution of ER data errors. For convenience, the method 200 will be described with respect to a system that includes one or more computing devices and performs the method 200. Specifically, the method 200 will be described with respect to data cleaning by ER data cleaning system 130 in merchant data management system 100.

In embodiments, the system receives 205 a group of N references to a candidate ER error entity (e.g., a merchant entity described by persistent data in a merchant data repository 120). In some embodiments, the group of N references includes all of the references to the candidate ER error entity while, in some alternate embodiments, the group of N references is a subset of all of the references to the candidate ER error entity. In some embodiments, the input group of references may be represented as a graph, as previously described with reference to FIG. 1. In some embodiments, the candidate ER error entity is selected based on its associated ER error score, as previously described with reference to FIG. 1.

In embodiments, the system identifies 210 a set of the N references that are related to at least one of the other references in the group. In some embodiments in which the references in the received group of references are represented as nodes in a graph, the set of the N references includes all of the references that share at least one edge with another of the references.

In embodiments, the system calculates 215 an ER score for each pair of the related references in the selected set of references. In some embodiments, the ER score represents a likelihood that the pair references the candidate ER error entity. In some embodiments, the ER score calculation is implemented using a machine learning algorithm, as described previously with reference to FIG. 1. In some embodiments, the ER score calculation is implemented by an entity resolution system 110 in the same way that entity resolution is performed on new input data 112 received by system 100. In embodiments, the system determines 220, based in part on the ER score calculations, whether there is a likely ER error in grouping the references. In some embodiments, the determination further includes a count of unique references among the received group of N references. In embodiments, a variety of causes of ER errors may occur. Examples of causes of ER errors may include one or a combination of the ER scores being out of date (i.e., additional new input data were received by the system after the previous grouping of the references was made); labeling errors in data received from external sources; and human errors in providing labels.

In an instance in which no likely ER data errors are determined 225 to have occurred, the group of N references is returned as a single group and the process ends 255.

In an instance in which likely ER data errors are determined 225 to have occurred, the system selects 230 a set of the pairs of related references for validation of their respective ER scores. Since there is a significant time and resource cost associated with validating each ER score, electing a set of the pairs for validation instead of validating all of the ER scores reduces the overall cost of validation. In some embodiments, a pair is selected for ER score validation if its associated ER score does not satisfy an ER score threshold.

In some embodiments, the system is parameterized to enable inputting, as configuration data, the ER score threshold and a number of pairs to select for validation. In this way, the parameter values may be selected to optimize the system performance in processing ER data from any particular data corpus. In some embodiments, the parameter values may be selected based on experimentation using standard grid search techniques. For example, in some embodiments, the optimal ER score threshold and maximum number of pairs selected for validation are a threshold of 0.1 (i.e., any ER scores below this threshold are candidates for validation) and a maximum of 2 pairs to be sent to an oracle for validation.

In embodiments, the system sends 235 the selected set of pairs to an oracle (e.g., oracle 140 referenced in FIG. 1) for validation of their respective ER scores. In response to receiving the validation results from the oracle, the system adjusts at least one of the pairs' ER scores by calculating 240 a paralyzed score based on the validated ER score. In some embodiments, the validated ER score returned by the oracle is a "match" or "no match" decision, and the paralyzed score represents an unambiguous match or non-match decision. In some embodiments, for example, in which the ER score is a value between 0 and 1, where 0 represents an unambiguous non-match and 1 represents an unambiguous match, a paralyzed score is calculated by adjusting the ER score to 0 or 1 based on the oracle's decision. In some embodiments in which the validated ER score represents a likelihood of either match or non-match (e.g., is a value between 0 and 1), calculating a paralyzed score includes determining whether the validated ER score satisfies a match threshold. Alternatively, in some embodiments, calculating a paralyzed score may include either adding or subtracting some amount to the original pair score by some amount based on the "match" or "no-match" decision received from the oracle.

In embodiments, the system re-groups 245 the set of related references based in part on their respective ER scores (which now include paralyzed scores). There are a variety of well-known grouping methods that may be used for re-grouping references; the choice of grouping method is not critical to the invention. In embodiments, exemplary grouping methods may include one or a combination of Expectation/Maximization clustering with k=2 (a machine learning clustering technique, with a pre-determined choice of two clusters); Generalized DBSCAN clustering (a machine learning clustering technique with a minimum number of points per cluster=1 and epsilon=0.5); OPTICS clustering with xi cluster extraction (a machine learning clustering technique, with a minimum number of points per cluster=1, xi varying between 0 and 1, by 0.1 (contrast parameter for relative decrease in density for cluster choosing); Hierarchical clustering with various linkage methods (a machine learning clustering method and/or using methods including single, complete, and group average); and Kmediods.

In some embodiments, re-grouping may be recursive, and the system recursively may implement steps 210 through 245 within each group formed via the re-grouping.

In embodiments, the system re-assigns 250 the group of each of the N references based on the re-grouping, returns the adjusted grouping of references, and the process ends 255.

Figure 3:
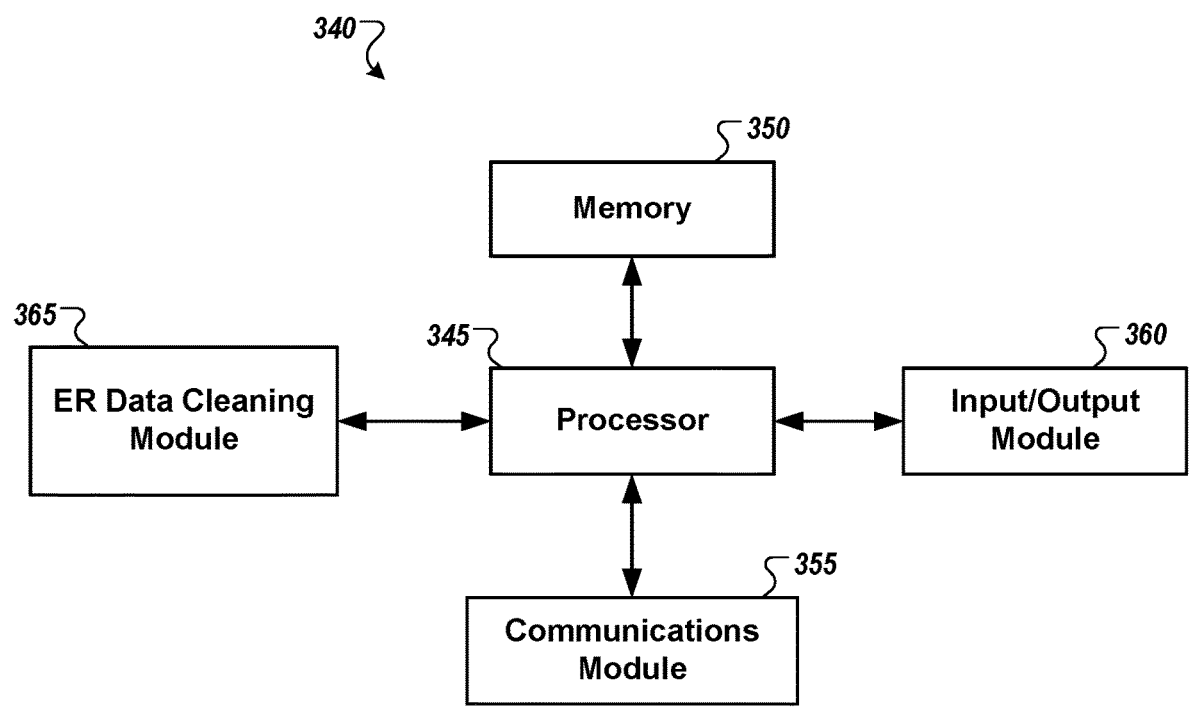
FIG. 3 illustrates a schematic block diagram of circuitry that can be included in a computing device, such as an ER data cleaning system, in accordance with some embodiments discussed herein.

FIG. 3 shows a schematic block diagram of circuitry 300, some or all of which may be included in, for example, merchant data system 100. As illustrated in FIG. 3, in accordance with some example embodiments, circuitry 300 can include various means, such as processor 302, memory 304, communications module 306, and/or input/output module 308. As referred to herein, "module" includes hardware, software and/or firmware configured to perform one or more particular functions. In this regard, the means of circuitry 300 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 304) that is executable by a suitably configured processing device (e.g., processor 302), or some combination thereof.

Processor 302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments processor 302 comprises a plurality of processors. The plurality of processors may be embodied on a single computing device or may be distributed across a plurality of computing devices collectively configured to function as circuitry 300. The plurality of processors may be in operative communication with each other and may be collectively configured to perform one or more functionalities of circuitry 300 as described herein. In an example embodiment, processor 302 is configured to execute instructions stored in memory 304 or otherwise accessible to processor 302. These instructions, when executed by processor 302, may cause circuitry 300 to perform one or more of the functionalities of circuitry 300 as described herein.

Whether configured by hardware, firmware/software methods, or by a combination thereof, processor 302 may comprise an entity capable of performing operations according to embodiments of the present invention while configured accordingly. Thus, for example, when processor 302 is embodied as an ASIC, FPGA or the like, processor 302 may comprise specifically configured hardware for conducting one or more operations described herein. Alternatively, as another example, when processor 302 is embodied as an executor of instructions, such as may be stored in memory 304, the instructions may specifically configure processor 302 to perform one or more algorithms and operations described herein, such as those discussed in connection with FIGS. 1-2.

Memory 304 may comprise, for example, volatile memory, non-volatile memory, or some combination thereof. Although illustrated in FIG. 3 as a single memory, memory 304 may comprise a plurality of memory components. The plurality of memory components may be embodied on a single computing device or distributed across a plurality of computing devices. In various embodiments, memory 304 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 304 may be configured to store information, data (including analytics data), applications, instructions, or the like for enabling circuitry 300 to carry out various functions in accordance with example embodiments of the present invention. For example, in at least some embodiments, memory 304 is configured to buffer input data for processing by processor 302. Additionally or alternatively, in at least some embodiments, memory 304 is configured to store program instructions for execution by processor 302. Memory 304 may store information in the form of static and/or dynamic information. This stored information may be stored and/or used by circuitry 300 during the course of performing its functionalities.

Communications module 306 may be embodied as any device or means embodied in circuitry, hardware, a computer program product comprising computer readable program instructions stored on a computer readable medium (e.g., memory 304) and executed by a processing device (e.g., processor 302), or a combination thereof that is configured to receive and/or transmit data from/to another device, such as, for example, a second circuitry 300 and/or the like. In some embodiments, communications module 306 (like other components discussed herein) can be at least partially embodied as or otherwise controlled by processor 302. In this regard, communications module 306 may be in communication with processor 302, such as via a bus. Communications module 306 may include, for example, an antenna, a transmitter, a receiver, a transceiver, network interface card and/or supporting hardware and/or firmware/ software for enabling communications with another computing device. Communications module 306 may be configured to receive and/or transmit any data that may be stored by memory 304 using any protocol that may be used for communications between computing devices. Communications module 306 may additionally or alternatively be in communication with the memory 304, input/output module 308 and/or any other component of circuitry 300, such as via a bus.

Input/output module 308 may be in communication with processor 302 to receive an indication of a user input and/or to provide an audible, visual, mechanical, or other output to a user. Some example visual outputs that may be provided to a user by circuitry 300 are discussed in connection with FIG. 1. As such, input/output module 308 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 300 is embodied as a server or database, aspects of input/ output module 308 may be reduced as compared to embodiments where circuitry 300 is implemented as an end-user machine or other type of device designed for complex user interactions. In some embodiments (like other components discussed herein), input/output module 308 may even be eliminated from circuitry 300. Alternatively, such as in embodiments wherein circuitry 300 is embodied as a server or database, at least some aspects of input/output module 308 may be embodied on an apparatus used by a user that is in communication with circuitry 300. Input/output module 308 may be in communication with the memory 304, communications module 306, and/or any other component (s), such as via a bus. Although more than one input/output module and/or other component can be included in circuitry 300, only one is shown in FIG. 3 to avoid overcomplicating the drawing (like the other components discussed herein).

ER data cleaning module 310 may also or instead be included and configured to perform the functionality discussed herein related to the ER data cleaning discussed above. In some embodiments, some or all of the functionality of ER data cleaning may be performed by processor 302. In this regard, the example processes and algorithms discussed herein can be performed by at least one processor 302 and/or ER data cleaning module 310. For example, non-transitory computer readable media can be configured to store firmware, one or more application programs, and/or other software, which include instructions and other computer-readable program code portions that can be executed to control each processor (e.g., processor 302 and/or ER data cleaning module 310) of the components of system 100 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 302 and/or ER data cleaning module 310 discussed above with reference to FIG. 3, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 304) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer program product, stored on a non-transitory computer readable medium, comprising instructions that when executed on one or more computers cause the one or more computers to perform operations implementing automatic entity resolution (ER) data cleaning, the operations comprising:
   receiving a group of N references to a candidate ER error entity,
   wherein the references and the candidate ER entity are persistent data stored in a data repository, and
   wherein the references each include attribute data describing the candidate ER entity;
   identifying a set of related references within the group of N references,
   wherein each related reference is related to at least one other reference of the group of N references;
   for each pair of references identified as a part of the set of the related references, calculating an ER score representing a likelihood that the pair of related references refers to the candidate ER error entity, wherein calculation of each ER score is implemented using a machine learning algorithm, wherein a binary classifier, derived using supervised machine learning, is trained to return a result label of "match" or "no match" as a decision of whether or not an input pair of entity references describes the same entity, and wherein the result label is returned with a value of an ER score representative of a certainty in the decision;
   determining based on the calculation of each ER score, whether an ER error has occurred in grouping the references;
   in an instance in which a determination that no errors have occurred in the grouping of references, returning the grouping of references as a single grouping;
   in an instance in which a determination is made that an ER error has occurred in the grouping of the references, selecting a set of the pairs of the related references for validation of their ER scores,
   wherein the set of pairs selected for validation is a subset of all the related references, the subset of all the related references being less than an entirety of the related references,
   wherein the ER score threshold and the number of pairs to select for validation are parameterized such that any ER score failing to meet a predefined threshold is a candidate for validation and each set of pairs having an ER score failing to meet the predefined threshold up to a predefined maximum amount of pairs is selected for validation,
   wherein the predefined maximum is a size of the set of pairs selected for validation, and
   wherein selection of the predefined maximum amount of pairs for validation is based on results from grid search experimentation such that particular ER score thresholds are associated with a particular maximum amount of pairs selected for validation;
   sending the selected set of the pairs to an oracle for validation of their ER scores;
   receiving validated ER scores from the oracle, the validated ER scores indicative of a match or non-match and are associated with a value between 0 and 1;
   adjusting at least one of the validated ER scores by calculating a paralyzed ER score including determining whether the validated ER score satisfies a match threshold; and
   performing a recursive re-grouping process comprising:
   re-grouping, using a grouping method, the set of related references based in part on their respectively associated ER scores forming additional new input data based on the re-grouping of the references, the respectively associated ER scores comprising the paralyzed ER score;
   re-assigning the group of each of the N references based on the re-grouping; and
   recalculating a pairwise matching of the additional new input data formed based on the re-grouping of the references.

2. The computer program product of claim 1, wherein the group of N references is represented as a graph, wherein each reference is represented as a graph node, and wherein each graph edge represents the relationship between a pair of nodes connected by the edge.

3. The computer program product of claim 2, wherein the ER score calculated for a pair of the related references is associated with the edge connecting the pair of related references.

4. The computer program product of claim 1, wherein receiving the group of N references is preceded by selecting the candidate ER error entity based on an ER error score that represents the likelihood that the entity is described by erroneous ER data.

5. The computer program product of claim 4, wherein the ER error score includes one or more of a count of the number of unique references in the group of N references and a count of the number of duplicates of the candidate ER error entity that are identified within the persistent data stored in the data repository.

6. The computer program product of claim 4, wherein the group of N references is represented as a graph, and wherein the ER error score may be derived based in part on an analysis of the graph edges.

7. The computer program product of claim 1, wherein calculating the ER score for a related pair of references is implemented using a machine learning algorithm.

8. The computer program product of claim 1, wherein selecting a pair of the related references for validation of their ER score comprises: determining whether their ER score satisfies an ER score threshold; and selecting the pair of related references in an instance in which their ER score does not satisfy the ER score threshold.

9. The computer program product of claim 1, wherein the ER score is a value between 0 and 1, and wherein calculating a paralyzed ER score comprises: determining whether the ER score satisfies a match threshold; and adjusting the ER score to 1 in an instance in which the ER score satisfies the match threshold.

10. The computer program product of claim 9, further comprising:
adjusting the ER score to 0 in an instance in which the ER score does not satisfy the match threshold.

11. The computer program product of claim 1, wherein the grouping method is at least one of Expectation/Maximization clustering, Generalized DBSCAN clustering, OPTICS clustering with xi cluster extraction, and Hierarchical clustering with various linkage methods.

12. The computer program product of claim 1, wherein the oracle is at least one of a crowd, a flat file of data verification results previously received from one or more oracles, and data verification software.

13. A system comprising: one or more computers and one or more non-transitory storage devices storing instructions that are operable, when executed by the one or more computers, to cause the one or more computers to perform operations implementing automatic entity resolution (ER) data cleaning, the operations comprising:
receiving a group of N references to a candidate ER error entity, wherein the references and the candidate ER entity are persistent data stored in a data repository, and wherein the references each include attribute data describing the candidate ER entity;
identifying a set of related references within the group of N references,
wherein each related reference is related to at least one other of the group of N references;
for each pair of references identified as a part of the set of the related references, calculating an ER score representing a likelihood that the pair of related references refers to the candidate ER error entity, wherein calculation of each ER score is implemented using a machine learning algorithm, wherein a binary classifier, derived using supervised machine learning, is trained to return a result label of "match" or "no match" as a decision of whether or not an input pair of entity references describes the same entity, and wherein the result label is returned with a value of an ER score representative of a certainty in the decision;
determining based on the calculation of each ER score, whether an ER error has occurred in grouping the references;
in an instance in which a determination that no errors have occurred in the grouping of references, returning the grouping of references as a single grouping;
in an instance in which a determination is made that an ER error has occurred in the grouping of the references,
selecting a set of the pairs of the related references for validation of their ER scores,
wherein the set of pairs selected for validation is a subset of all the related references, the subset of all the related references being less than an entirety of the related references,
wherein the ER score threshold and the number of pairs to select for validation are parameterized such that any ER score failing to meet a predefined threshold is a candidate for validation and each set of pairs having an ER score failing to meet the predefined threshold up to a predefined maximum amount of pairs is selected for validation,
wherein the predefined maximum is a size of the set of pairs selected for validation,
wherein selection of the predefined maximum amount of pairs for validation is based on results from grid search experimentation such that particular ER score thresholds are associated with a particular maximum amount of pairs selected for validation;
sending the selected set of the pairs to an oracle for validation of their ER scores;
receiving validated ER scores from the oracle, the validated ER scores indicative of a match or nonmatch and are associated with a value between 0 and 1;
adjusting at least one of the validated ER scores by calculating a paralyzed ER score, including determining whether the validated ER score satisfies a match threshold; and
performing a recursive re-grouping process comprising:
re-grouping, using a grouping method, the set of related references based in part on their respectively associated ER scores forming additional new input data based on the re-grouping of the references, the respectively associated ER scores comprising the paralyzed ER score;
re-assigning the group of each of the N references based on the re-grouping; and
recalculating a pairwise matching of the additional new input data formed based on the re-grouping of the references.

14. The system of claim 13, wherein the group of N references is represented as a graph, wherein each reference is represented as a graph node, and wherein each graph edge represents the relationship between a pair of nodes connected by the edge.

15. The system of claim 14, wherein the ER score calculated for a pair of the related references is associated with the edge connecting the pair of related references.

16. The system of claim 13, wherein receiving the group of N references is preceded by selecting the candidate ER error entity based on an ER error score that represents the likelihood that the entity is described by erroneous ER data.

17. The system of claim 16, wherein the ER error score includes one or more of a count of the number of unique references in the group of N references and a count of the number of duplicates of the candidate ER error entity that are identified within the persistent data stored in the data repository.

18. The system of claim 16, wherein the group of N references is represented as a graph, and wherein the ER error score may be derived based in part on an analysis of the graph edges.

19. The system of claim 13, wherein calculating the ER score for a related pair of references is implemented using a machine learning algorithm.

20. The system of claim 13, wherein selecting a pair of the related references for validation of their ER score comprises: determining whether their ER score satisfies an ER score threshold; and selecting the pair of related references in an instance in which their ER score does not satisfy the ER score threshold.

21. The system of claim 13, wherein the ER score is a value between 0 and 1, and wherein calculating a paralyzed ER score comprises: determining whether the ER score satisfies a match threshold; and adjusting the ER score to 1 in an instance in which the ER score satisfies the match threshold.

22. The system of claim 21, further comprising: adjusting the ER score to 0 in an instance in which the ER score does not satisfy the match threshold.

23. The system of claim 13, wherein the grouping method is at least one of Expectation/Maximization clustering, Generalized DBSCAN clustering, OPTICS clustering with xi cluster extraction, and Hierarchical clustering with various linkage methods.

24. The system of claim 13, wherein the oracle is at least one of a crowd, a flat file of data verification results previously received from one or more oracles, and data verification software.

* * * * *